(12) United States Patent
Mensch et al.

(10) Patent No.: US 11,722,315 B2
(45) Date of Patent: Aug. 8, 2023

(54) FACTORY DATA STORAGE AND RECOVERY

(71) Applicant: Apple Inc., Cupertino, CA (US)

(72) Inventors: Thomas P. Mensch, Sunnyvale, CA (US); Chiye K. Kojima, Mountain View, CA (US); Han Jong Yu, Santa Clara, CA (US); Jerrold V. Hauck, Windermere, FL (US); Muralidhar S. Vempaty, San Jose, CA (US); Peter Chang, Santa Clara, CA (US); Tiffany Shih-Yu Fang, Shanghai (CN); Yiqun Zhu, Shanghai (CN)

(73) Assignee: APPLE INC., Cupertino, CA (US)

( * ) Notice: Subject to any disclaimer, the term of this patent is extended or adjusted under 35 U.S.C. 154(b) by 708 days.

(21) Appl. No.: 16/532,197

(22) Filed: Aug. 5, 2019

(65) Prior Publication Data

US 2020/0084050 A1 Mar. 12, 2020

Related U.S. Application Data

(60) Provisional application No. 62/729,931, filed on Sep. 11, 2018.

(51) Int. Cl.
*H04L 9/32* (2006.01)
*G06T 7/80* (2017.01)
*G06F 16/901* (2019.01)

(52) U.S. Cl.
CPC .......... *H04L 9/3263* (2013.01); *G06F 16/901* (2019.01); *G06T 7/80* (2017.01)

(58) Field of Classification Search
None
See application file for complete search history.

(56) References Cited

U.S. PATENT DOCUMENTS

| | | | |
|---|---|---|---|
| 8,888,600 B2 * | 11/2014 | Nguyen | G07F 17/32 463/43 |
| 9,542,558 B2 * | 1/2017 | Mensch | H04L 9/3247 |
| 2014/0089682 A1 | 3/2014 | Gulati et al. | |
| 2015/0261966 A1 | 9/2015 | Mensch et al. | |
| 2017/0093869 A1 * | 3/2017 | Love | A61B 5/14865 |
| 2017/0373843 A1 | 12/2017 | Benson et al. | |
| 2019/0319808 A1 * | 10/2019 | Fallah | H04L 9/3265 |
| 2019/0349204 A1 * | 11/2019 | Enke | H04N 21/4367 |

* cited by examiner

*Primary Examiner* — Brandon Hoffman
(74) *Attorney, Agent, or Firm* — Womble Bond Dickinson (US) LLP

(57) ABSTRACT

Systems and methods for storing and recovering data for a device are described. In one embodiment, factory generated calibration data can be generated, sealed and restored securely even if two sensors in two different devices, such as a first ambient light sensor and a second ambient light sensor have the same sensor identifier. In one embodiment, a device transmits a database key to cause storage or recovery of the calibration data, and the database key includes a sensor identifier and a public cryptographic key of the device.

21 Claims, 11 Drawing Sheets

FACTORY DATA STORAGE AND RECOVERY

This application claims the benefit of priority to U.S. Provisional Patent Application No. 62/729,931, filed Sep. 11, 2018, which application is hereby incorporated herein by reference.

BACKGROUND

This disclosure relates to systems and methods for obtaining factory data, such as calibration data for one or more sensors of a data processing system, and storing the data for later use such as recovery of the data when the data processing system, such as a smart phone, needs to be restored from a condition in which the calibration data in the data processing system has been lost or deleted, etc.

A data processing system, such as a smart phone or tablet computer, can be assembled from a variety of individual electronic components, each of which are tested during manufacturing. During testing, the components should function within an acceptable performance range to be considered a passing component. However, even among passing components, there may still be some variation in the quality of the component and this may be acceptable as long as the variation is within acceptable tolerance. To compensate for the variations within the acceptable tolerances, the collection of performance data that is gathered during component testing is used to adjust the input or output or both the input and the output of the components during the operation of the system being tested, and this adjustment can be made with calibration data that is created during the component testing. The generated calibration data can then be stored with the device in order to allow the components and/or the device to use the calibration data during operation of the device to provide improved performance of the components in the device.

Once a complete data processing system or device is assembled from the individual components, the device can undergo additional testing and additional calibration data can be gathered and used to correct for errors created by variances due to the combined tolerances of the many components within the assembled device or data processing system. For example, the gain of the antennas of a wireless communication interface of a device can be set or adjusted, the display contrast can be configured to a suitable default level, and other parameters can be set at this stage. Additionally, if a device is to access a particular wireless communication network, such as a mobile telephone radio network, the device can be provisioned to communicate over the network, and the wireless radio system is configured and calibrated, as proper radiofrequency calibration for the wireless baseband processor is essential for ensuring that each device meets the regulatory requirements prescribed by the various communications regulatory agencies around the world. Moreover any sensors, such as near field communications sensors, touch identification sensors, ambient light sensors, facial recognition sensors, motion sensors, or other types of sensors that are contained within the device can be calibrated in the factory or assembly location.

U.S. Pat. No. 9,542,558 a describes an example of how the calibration data can be stored in the device's main nonvolatile memory such as flash memory as opposed to being stored within nonvolatile memory within each sensor. Moreover, U.S. Pat. No. 9,542,558 also describes how this data and potentially other data can be stored on a remote data store that can be used later to restore the calibration data when the device needs to restore the calibration data. Restoration of a device can be necessary when the device is erased as a result of a repair or an intentional erasing when the device is lost or stolen, or for other reasons.

The methods and systems described in U.S. Pat. No. 9,542,558 rely upon certain assumptions with respect to the sensors. One of these assumptions is that the sensor identifiers are unique such that each sensor within a family of sensors has a unique sensor identifier. In other words, within a particular type of sensor, such as a baseband sensor, it is assumed that the sensor identifiers will be unique across all devices having that particular type of sensor. However, in practice it turns out that sometimes they are not unique, and hence two different sensors of the same type on two different devices can have the same sensor identifier. This can cause data pollution in which a sensor in a device (first device) is restored with the wrong calibration data from a different device (second device) when the first device is restored. This is referred to as a data instance collision. In some cases, a data instance collision will cause the device to malfunction while in other cases the device may not operate at all and can become completely useless.

SUMMARY OF THE DESCRIPTION

Systems and methods for storing and recovering data for a device are described. In one embodiment, factory generated calibration data can be generated, sealed and restored securely even if two sensors in two different devices, such as a first ambient light sensor and a second ambient light sensor, have the same sensor identifier. In one embodiment, a device can transmit a database key to cause storage or recovery of the calibration data in a database, and the database key can include a sensor identifier and a public cryptographic key of the device. In one embodiment, the association, within the database key, of the sensor identifier and the public cryptographic key of the device can prevent a data instance collision. The database can store the calibration data with the database key so that the calibration data can be found and retrieved from the database, and the database can be stored on a remote data store that can be securely accessed when the device needs to restore the calibration data and potentially other data. In one embodiment, the public cryptographic key can originate from a secure enclave processing (SEP) system in the device. For example, the public cryptographic key can be created in the secure enclave processing system as a public key and private key pair (an asymmetric key pair) through known public key cryptographic techniques and the private key can remain sequestered in the secure enclave processing system (and not accessible to components outside of the SEP). In one embodiment, the private key and public key pair can be used as attestation keys to attest to a reference key pair (reference public key and reference private key pair) that can be an ephemeral signing key that is used to cryptographically sign the calibration data during a process for storing or recovering the calibration data.

In one embodiment, a device can perform a method which can include the following operations: entering, by a device, into a mode on the device to set up calibration data for a first sensor on the device; receiving, by the device, calibration data for the first sensor, the first sensor including a sensor identifier for the first sensor; and transmitting, by the device, a database key that includes the sensor identifier associated in the database key with a first public key, the database key configured to retrieve, from a database, calibration data for the sensor in a recovery mode of the device. In one embodiment, the method can further include: transmitting, by the device, a first signing public key and an attestation of the first signing public key by a first private attestation key that is generated in and sequestered in a secure enclave processing system in the device, the first private attestation key being paired, through public key cryptography, with the first public key. In one embodiment, the method can further include: transmitting the calibration data to a data store after the device has been verified to have permission to store the calibration data on the data store which stores the database, wherein an association in the database key of the sensor identifier and the first public key prevents a data instance collision when two sensors in two different devices have the same sensor identifier. In one embodiment, the method can further include the operation of: storing the calibration data in a main nonvolatile memory of the device, the main nonvolatile memory storing an operating system of an application processing system and one or more application programs that execute on the application processing system. In one embodiment, the method can further include the operation of: receiving a device certificate, from a certificate authority, which includes the first public key and one or more identifiers of the device and a set of one or more permissions relating to the calibration data; wherein the first public key is an attestation key that is paired, through public key cryptography with the first private attestation key and wherein the first public key is used to verify attestation of a first signing public key by the first private attestation key, the attestation establishing that the first signing public key originated from the secure enclave processing system that is trusted by the certificate authority. The first signing public key can be used to verify a signature of the calibration data, wherein the signature is provided by the corresponding private signing key. In one embodiment, the calibration data is configured to provide calibrated results for the first sensor, and the device includes a plurality of sensors including the first sensor, and each sensor of the plurality of sensors is calibrated with corresponding calibration data. In one embodiment, the plurality of sensors can include at least two of: a baseband processor sensor, a near field communication sensor, a touch identification sensor, an ambient light sensor, and a facial recognition sensor.

In one embodiment, a device can perform a method which can include the following operations: entering into a recovery mode on the device; and transmitting, by the device, a database key that includes a sensor identifier and a first public key of the device, the sensor identifier identifying a first sensor in a set of one or more sensors, and the database key being used to retrieve, from a database, calibration data for the first sensor. In one embodiment, the method can further include the operation of: receiving the calibration data after the device has been verified to have permission to receive the calibration data, wherein an association in the database key of the sensor identifier and the first public key prevents a data instance collision when two sensors in two different devices have the same sensor identifier. In one embodiment, the method can further include the operation of: storing the calibration data in a main nonvolatile memory of the device, the main nonvolatile memory storing an operating system of an application processing system and one or more application programs that can execute on the application processing system. In one embodiment, the method can further include the operation of: receiving a device certificate which includes the first public key and one or more identifiers of the device. The first public key can be used to verify attestation of a first signing public key by a first private attestation key (which is the private key of the first public key); the attestation in one embodiment establishes that the first signing public key originated from a secure enclave processing system that is trusted by a certificate authority. In one embodiment, the set of one or more sensors can include at least two of: a baseband processor sensor, a near field communication sensor, a touch identification sensor, an ambient light sensor, and a facial recognition sensor.

In one embodiment, a system for permitting a device to recover calibration data can include a set of one or more certificate authority servers and a set of one or more data stores which are coupled to the set of one or more certificate authority servers. The set of one or more certificate authority servers can be configured to receive, from the device, a database key that includes a sensor identifier that identifies a first sensor of the device and a first public key of the device, wherein the database key is configured to retrieve, from a database stored in the set of one or more data stores, calibration data for the first sensor. In one embodiment, the set of one or more data stores is configured to transmit, to the device, the calibration data after the set of one or more certificate authority servers have verified that the device has permission to receive the calibration data, and wherein an association in the database key of the sensor identifier and the first public key prevents a data instance collision when two sensors in two different devices have the same sensor identifier. In one embodiment, the first public key is an attestation key that is paired, through public key cryptography, with a first private attestation key that is generated in and secure within a secure enclave processing system in the device. In one embodiment, the set of one or more certificate authority servers is configured to transmit, to the device, a device certificate that includes the first public key and one or more identifiers of the device. The first public key can be used to verify attestation of a first signing public key by the first private attestation key, the attestation establishing that the first signing public key originated from the secure enclave processing system that is trusted by the set of one or more certificate authority servers. In one embodiment, the first signing public key and the first private attestation keys are a public and private key pair created by the secure enclave processing system. In one embodiment, the plurality of sensors can include at least two of: a baseband processing sensor, a near field communication sensor, a touch identification sensor, an ambient light sensor, and a facial recognition sensor.

The embodiments described herein can include non-transitory machine readable media that store executable computer program instructions which when executed by one or more data processing systems cause the one or more data processing systems to perform the one or more methods described herein. The non-transitory machine readable media can include nonvolatile storage such as flash memory and other forms of memory such as DRAM.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

This disclosure is illustrated by way of example, and not limitation, in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
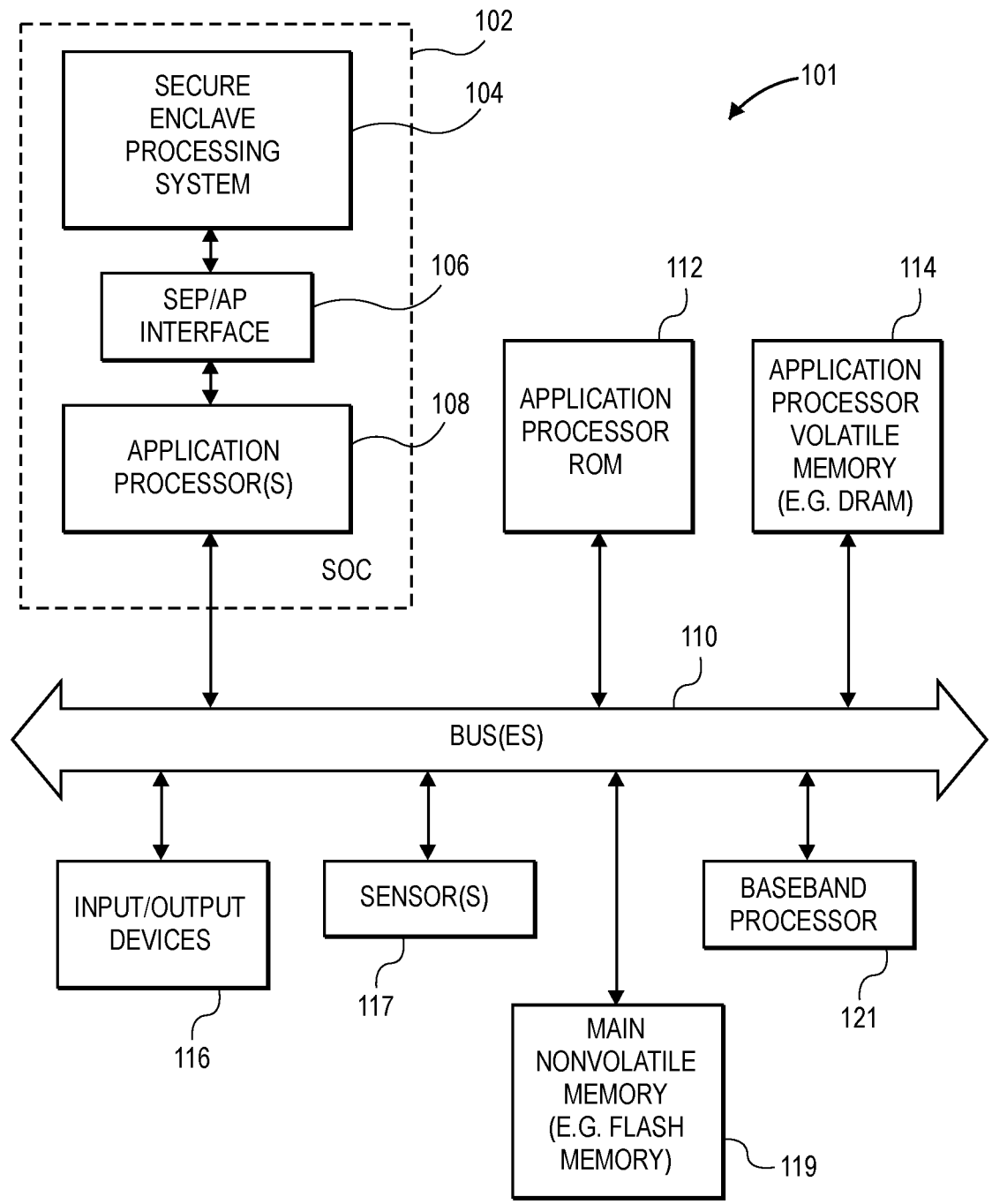
FIG. 1 shows an example of a device according to one embodiment.

FIG. 1 shows an example of a device that can store and use calibration data during normal use of the device and can also recover the calibration data from a remote data store in a recovery mode. The device 101 can include a system on chip (SOC) 102 that includes a secure enclave processing (SEP) system 104 and an application processing system 108. The application processing system 108 can include one or more processors or one or more processing cores as is known in the art. The SOC 102 can be a single integrated circuit monolithic die that includes both the SEP system 104 and the application processing system 108. The secure enclave processing system 104 can be similar to the SEP shown in FIG. 8 and can be similar to the SEP in iPhones from Apple Inc. of Cupertino, Calif. The SEP can securely store and use device identifiers and private keys that can be securely stored and sequestered within the secure enclave processing system and these identifiers and keys are not made available outside of the secure enclave processing system; in other words, this data such as these identifiers and keys can be isolated from the rest of the system at least in some embodiments. The secure enclave processing system can establish trust with one or more certificate authority servers through this secure storage of secrets in the memory of the secure enclave processing system. Published US patent application number US 2017/0373843 describes an example of a secure enclave processing system, and this published US patent application is hereby incorporated herein by reference. The secure enclave processing system 104 can be coupled to the application processing system 108 through an SEP/AP interface 106 which in one embodiment can be a mailbox mechanism as described in the published US patent application number US 2017/0373843. In an alternative embodiment, the SEP system 104 and the application processor(s) can be implemented on separate integrated circuits. The SOC 102 can be coupled to the rest of the components in the device 101 through one or more buses 110 as shown in FIG. 1. The device 101 can also include an application processor read only memory (ROM) 112, an application processor volatile memory 114, such as DRAM 114, one or more sensors 117, one or more input/output devices 116, a main nonvolatile memory 119 which can be flash memory in one embodiment, and a baseband processor 121. The application processor read only memory 112 can include operating system software such as firmware which is used to boot up the device 101 and can also be used during normal processing operations after boot up of the device 101. The application processor volatile memory 114 can store software for the processes which are executing at runtime of the device 101, and these processes can include operating system processes, application program processes, demon processes, and other processes known in the art, and the application processor volatile memory 114 can also store user data that is used by these processes. The input/output devices 116 can be any one of the known input and output devices, such as a touch screen input device which also serves as an output device, audio output devices, audio input devices, and other known input or output devices which can be used with data processing systems as is known in the art. The sensors 117 can be one or more sensors that use calibration data, such as one or more touch identification sensors, one or more facial recognition sensors, a baseband processor sensor, a near field communication sensor which can be used for payments through a near field communication, one or more ambient light sensors, and other sensors on the device 101. It will be appreciated that the present disclosure applies to a variety of different sensors including those mentioned herein as well as those not mentioned herein. The nonvolatile memory 119 can store one or more operating systems of the device 101 as well as one or more application programs, user data, and the calibration data described herein. In one embodiment, the main nonvolatile memory 119 can be flash memory which provides the main persistent storage for the device 101 and can also act as a backing store for the DRAM 114.

Figure 2:
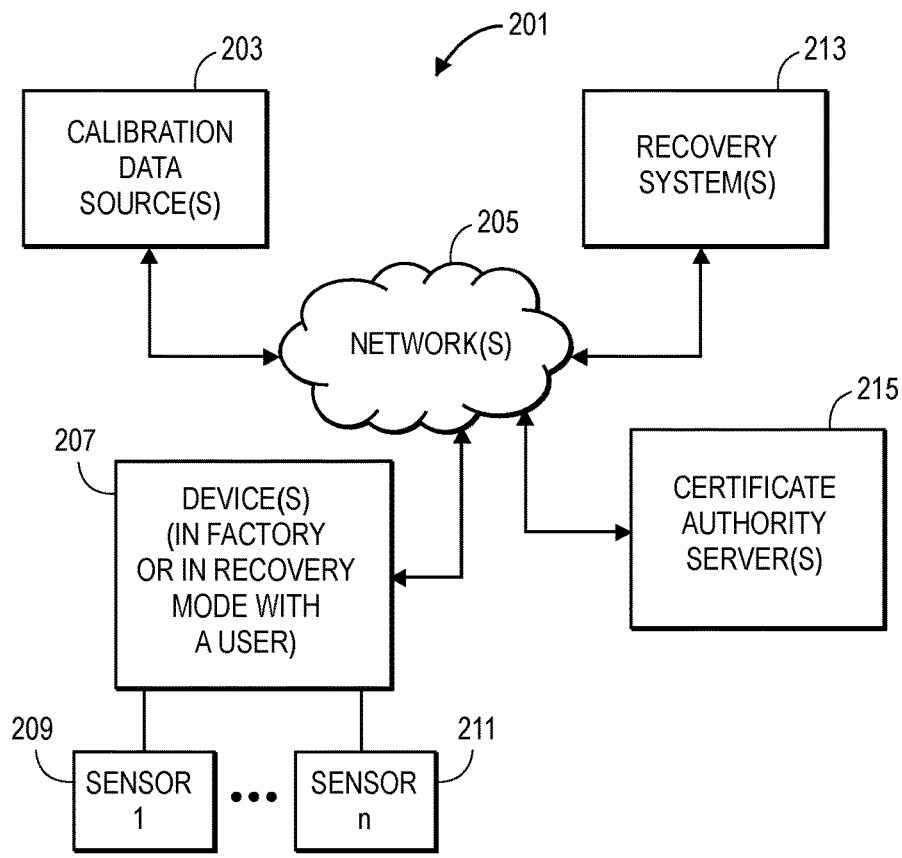
FIG. 2 shows an example of a set of systems which can be used in one or more embodiments described herein.

The device shown in FIG. 1 can be used in an environment which includes a set of systems 201 as shown in FIG. 2. The systems shown in FIG. 2 can be used to generate and provide calibration data to a device while it is in the factory and can also be used to allow the device to store the calibration data on a remote data store such as one or more recovery systems to allow the calibration data to be recovered should the device lose the calibration data. The set of systems 201 can include in one embodiment, one or more calibration data sources 203, one or more networks 205, a device 207, one or more recovery systems 213, and one or more certificate authority servers 215. It will be appreciated that the set of systems 201 shown in FIG. 2 can include multiple devices, where the device 207 is one of those multiple devices which are coupled to one or more networks 205 to receive calibration data and to provide the calibration data to one or more recovery systems 213. In one embodiment, the calibration data sources 203 can be a set of calibration stations in a factory or assembly location, and these calibration data sources 203 can generate the calibration data and then transmit the calibration data to one or more devices such as the device 207 shown in FIG. 2. In one embodiment, the network 205 may be a local secure network within the factory but also includes the ability to couple through the Internet to remote systems such as the recovery systems 213 and the certificate authority servers 215. In one embodiment, the device 207 can be the device 101 shown in FIG. 1. The set of systems shown in FIG. 2 can implement the methods described here in as well as implement the methods described in U.S. Pat. No. 9,542,558 which is hereby incorporated herein by reference; U.S. Pat. No. 9,542,558 describes a prior version of methods for generating and storing and recovering calibration data, and this prior version can be used for devices which only support this prior version while newer devices which support the methods described herein can use the methods described herein to generate, store, and recover calibration data. As shown in FIG. 2, the device 207 can include a plurality of sensors, such as sensor 209 and sensor 211. In one embodiment, these sensors can include a baseband processor sensor, a near field communication sensor which can be used to make payments in a method such as Apple Pay from Apple Inc. of Cupertino Calif., a touch identification sensor which can be used to recognize a fingerprint to allow access to the device, an ambient light sensor, and a facial recognition sensor which can be used to recognize a user's face to unlock the device based upon recognition of the user's face. The one or more recovery systems 213 can provide data stores in which calibration data from device 207 as well as other devices can be stored in the data stores. Use of the recovery systems to store calibration data can be controlled in one embodiment by the one or more certificate authority servers 215 which can verify the permission of the device 207 as well as other devices to verify that the device is permitted to store and recover calibration data from the one or more recovery systems 213. In the example shown in FIG. 2, the recovery systems 213 are distinct and separate from the one or more certificate authority servers 215. In an alternative embodiment, the recovery systems 213 and the certificate authority servers 215 may be combined together in a single server system rather than being distinct server systems. FIG. 5B, which is described further below, also includes a set of systems which can be distinct and separate systems in one embodiment.

Figure 3:
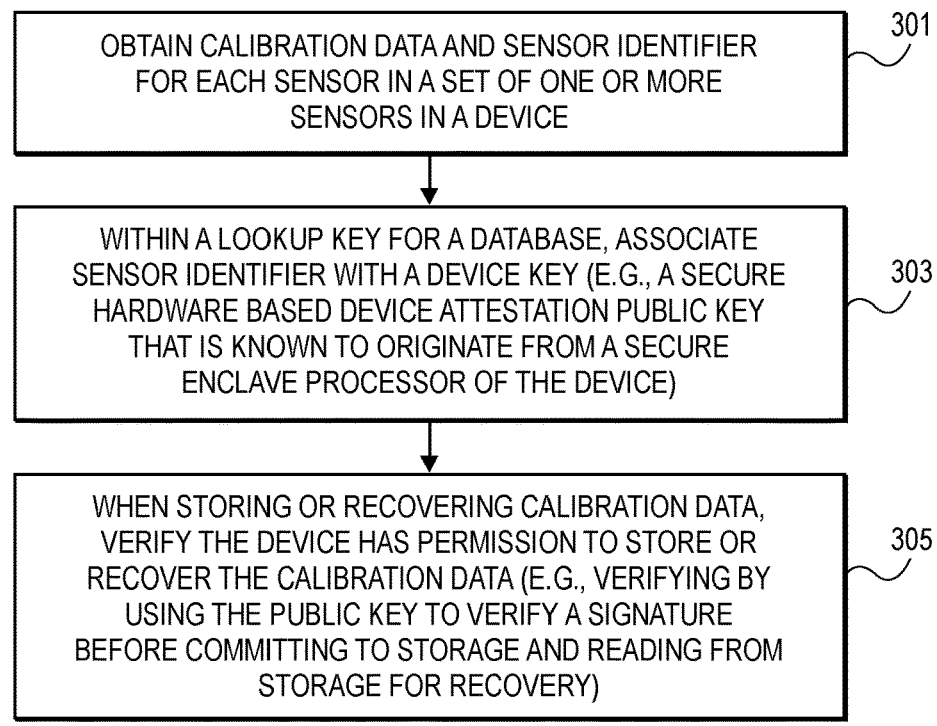
FIG. 3 is a flowchart which illustrates a method according to an embodiment.

The set of systems shown in FIG. 2 can use the method shown in FIG. 3 to store and recover calibration data in a manner which can prevent data instance collision. The method shown in FIG. 3 can begin in operation 301 in which calibration data is obtained for each sensor in a set of one or more sensors in a device. Each sensor can also provide a sensor identifier that identifies that sensor relative to other sensors in the family of that particular sensor. For example, a first ambient light sensor in a first device can provide a first sensor identifier which is different than a second sensor identifier from a second ambient light sensor in a second device. In one embodiment, the sensor identifiers for each ambient light sensor should be unique within the family of ambient light sensors; however, sometimes they are not unique and this can cause a data instance collision. Operation 303 shown in FIG. 3 can prevent the data instance collision by associating the sensor identifier in a database key with a device key, such as a secure hardware-based device attestation public key that is known to originate from a secure enclave processing system of the device. This association in the database key can prevent the data instance collision; in one embodiment, the database key is similar to a lookup key that is used to lookup information in a database to obtain or store that information in the database. The use of a secure hardware-based device key tends to ensure that only that device which has control over that key can cause storage of and recovery of calibration data for that device. This is shown in operation 305 of FIG. 3; in particular, when storing or recovering calibration data, a system can verify the device has permission to store or recover the calibration data before the device is allowed to store the calibration data on a recovery system and before the device is allowed to recover the calibration data from a recovery system, such as recovery system 213 shown in FIG. 2 or the factory data recovery (FDR) data store 531 shown in FIG. 5B. In one embodiment, the system that is responsible for this verification can be the one or more certificate authority servers described herein, such as the one or more certificate authority servers 215 in FIG. 2 or the certificate authority server 529 shown in FIG. 5B. In one embodiment, the verification can involve the use of the public key which is associated with the sensor identifier in the database key, where that public key is used to verify a signature, such as the signature of a reference public key by the private key corresponding to the public key which is in the database key. In one embodiment, this public key can be referred to as a silicon identity key (SIK) which has a public key (SIK pub key) and a corresponding private key (SIK pry key) that is securely stored within and sequestered within the secure enclave processing system of the device; the private key (SIK pry key) can be used to sign the reference public key (ref pub key), and the public key (SIK pub key) can be used to verify that signature in order to grant permission to store or recover the calibration data.

Figure 4:
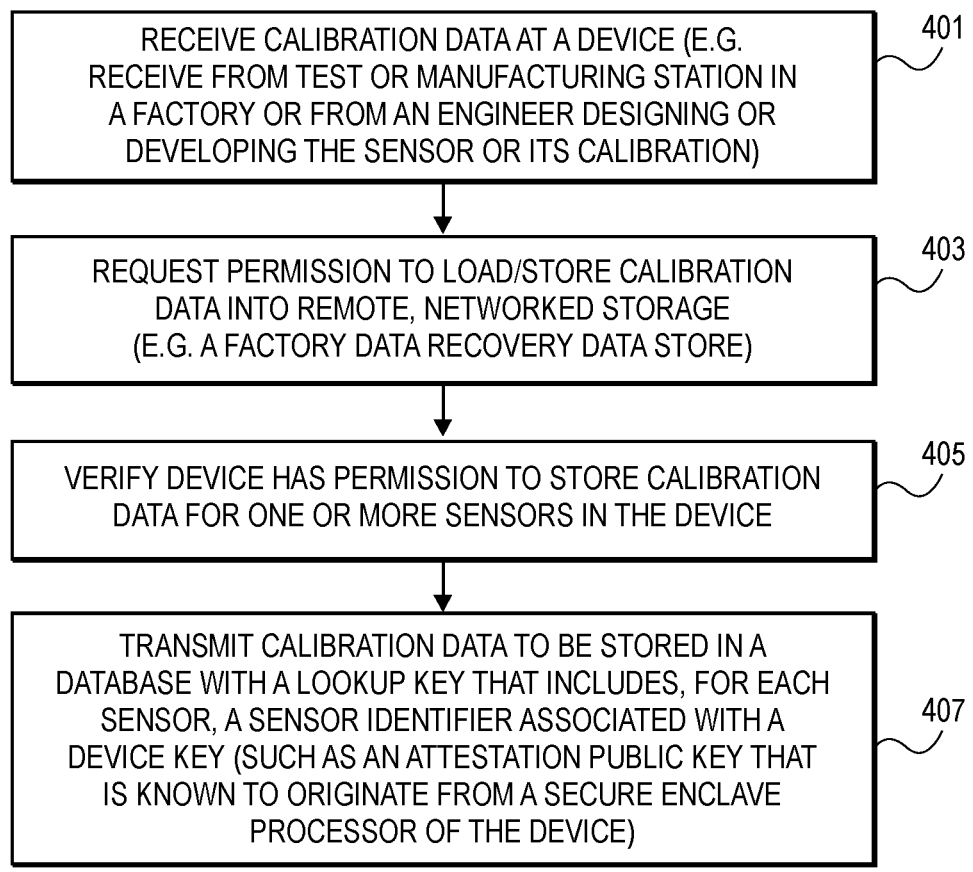
FIG. 4 is a flowchart that shows another method according to an embodiment.

A general version of the process of writing or storing calibration data to a database, such as a database on a remote data store, will now be provided while referring to FIG. 4. In operation 401 of FIG. 4, calibration data is received at a device which can be coupled to a test or manufacturing station in a factory. The calibration data can be received at the device directly from the test or manufacturing station or can be received through a network that the test or manufacturing station is coupled to. In another embodiment, the calibration data may be received from an engineer designing or developing the sensor or its calibration. In one embodiment, the device can receive different calibration data for different sensors in a serial fashion as the device moves through the manufacturing process, while in another embodiment, the device can receive the different calibration data once, in a batch download, at the end of a phase in the manufacturing process. In operation 403 the device or another system requests permission to load and store the calibration data into a remote, networked storage such as a factory data recovery data store; the data store 531 in FIG. 5B shows an example of such a data store. Then in operation 405, it is determined whether the device has permission to store the calibration data for one or more sensors in the device; in one embodiment, this permission is determined by one or more certificate authority servers which verify that permission. In one embodiment, this verification of the permission can utilize a verification of a signature using the public key of the device to verify that signature, where the public key is in the database key in association with the sensor identifier in the database key. If operation 405 determines that the device has permission to store the calibration data for one or more sensors in the device, then the calibration data is transmitted in operation 407 to be stored in a database with a database lookup key that includes, for each sensor, a sensor identifier associated with a device key, such as the SIK public key. In one embodiment, this public key can be an attestation public key that is known to originate from the secure enclave processing system of the device which has been verified to have permission to store the calibration data.

Figure 5A:
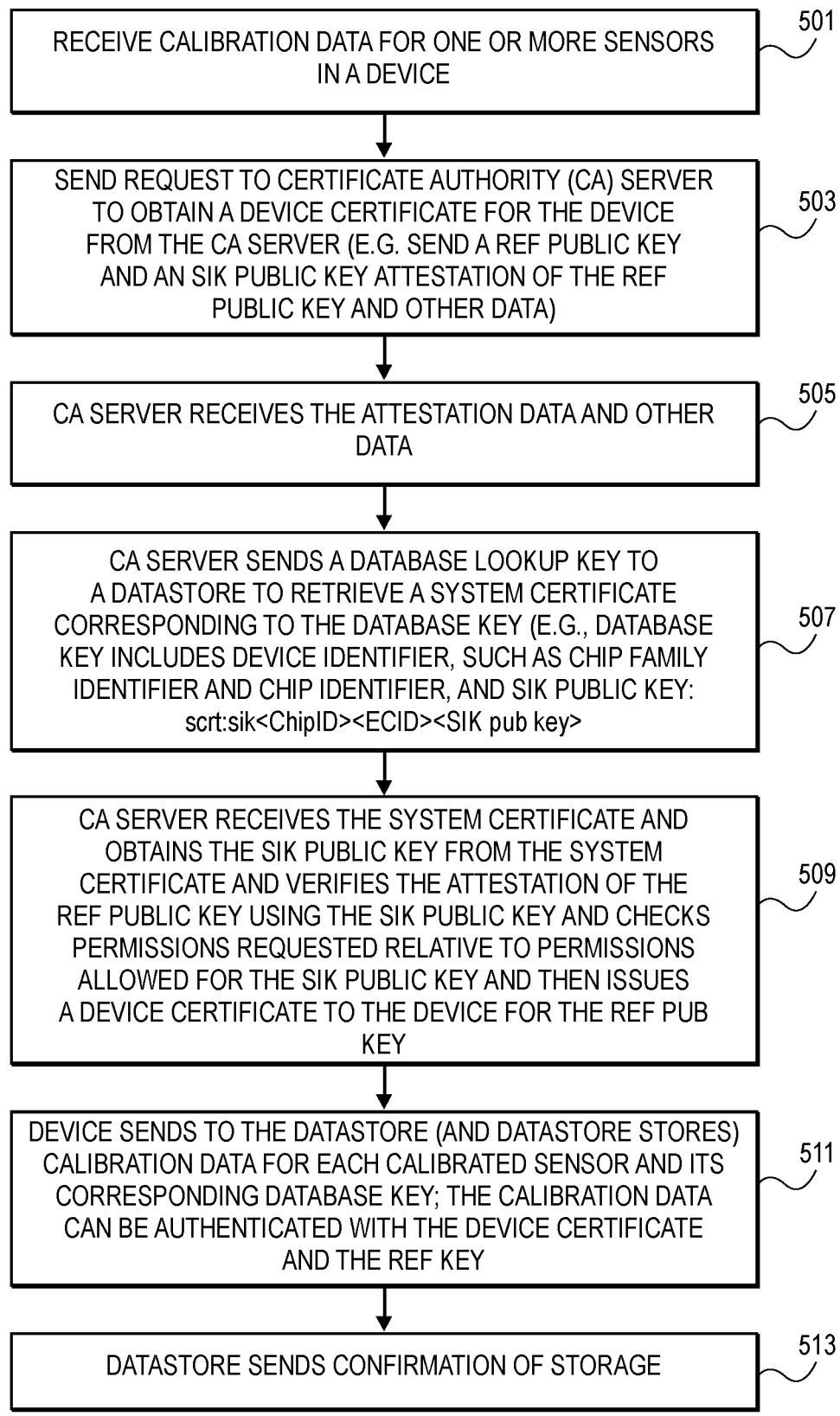
FIG. 5A is a flowchart that shows another method according to an embodiment.
Figure 5B:
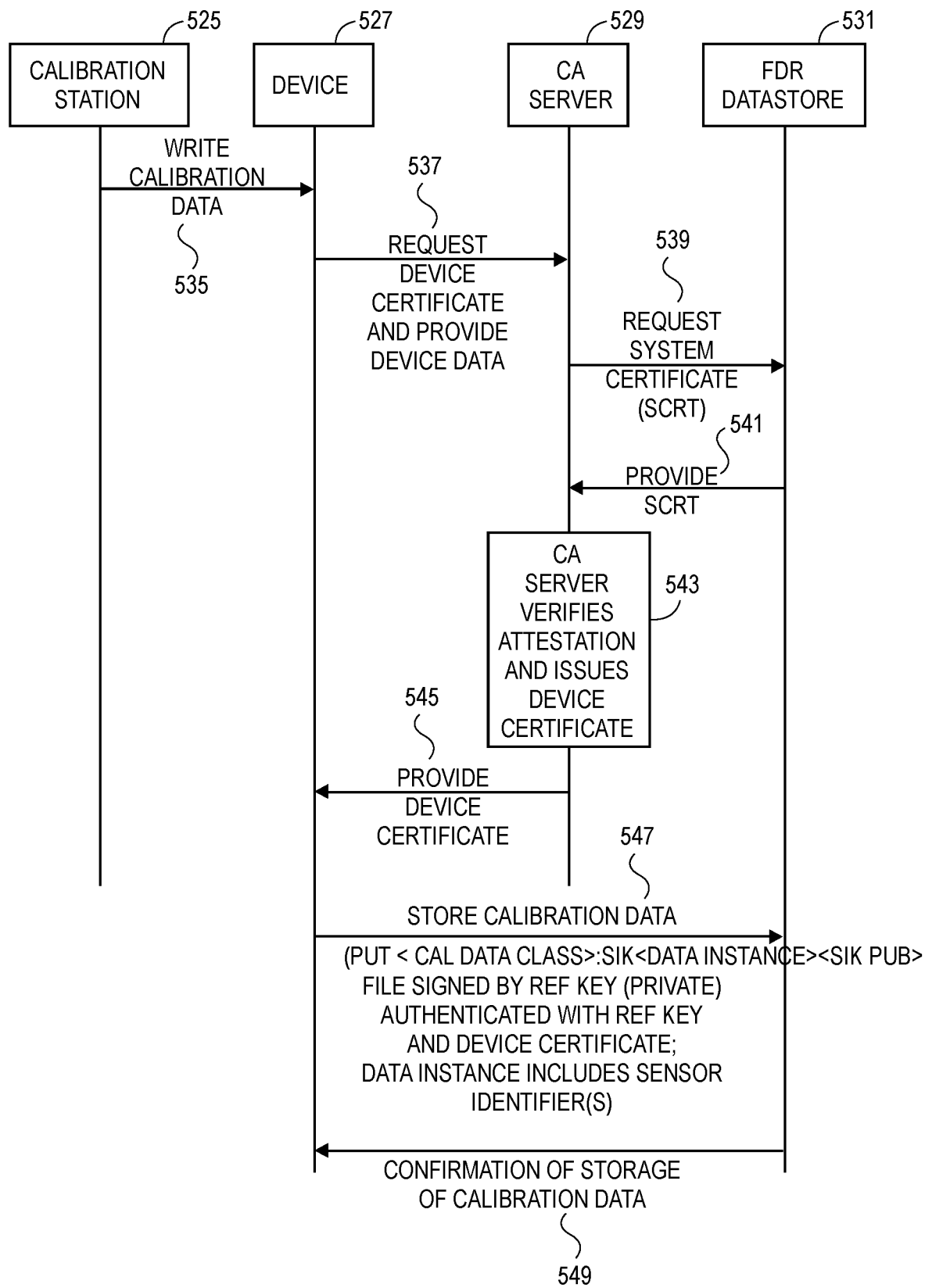
FIG. 5B is a diagram that shows the actions over time among several components in a system according to an embodiment.
Figure 6A:
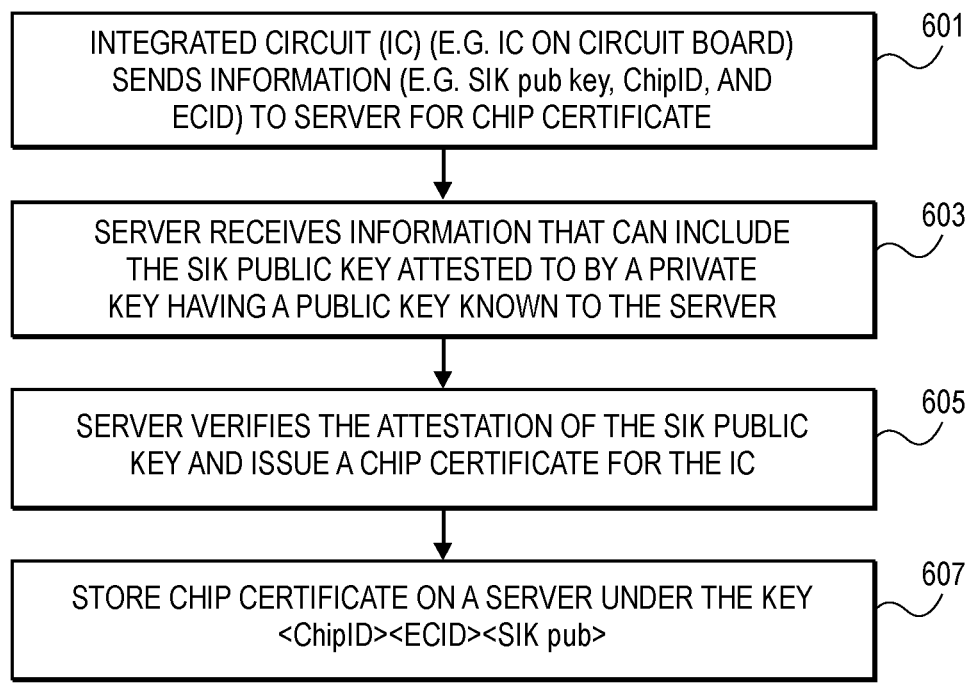
FIG. 6A shows a flowchart that illustrates a method, according to an embodiment, for collecting information from an integrated circuit (or set of integrated circuits) to create a chip certificate.
Figure 6B:
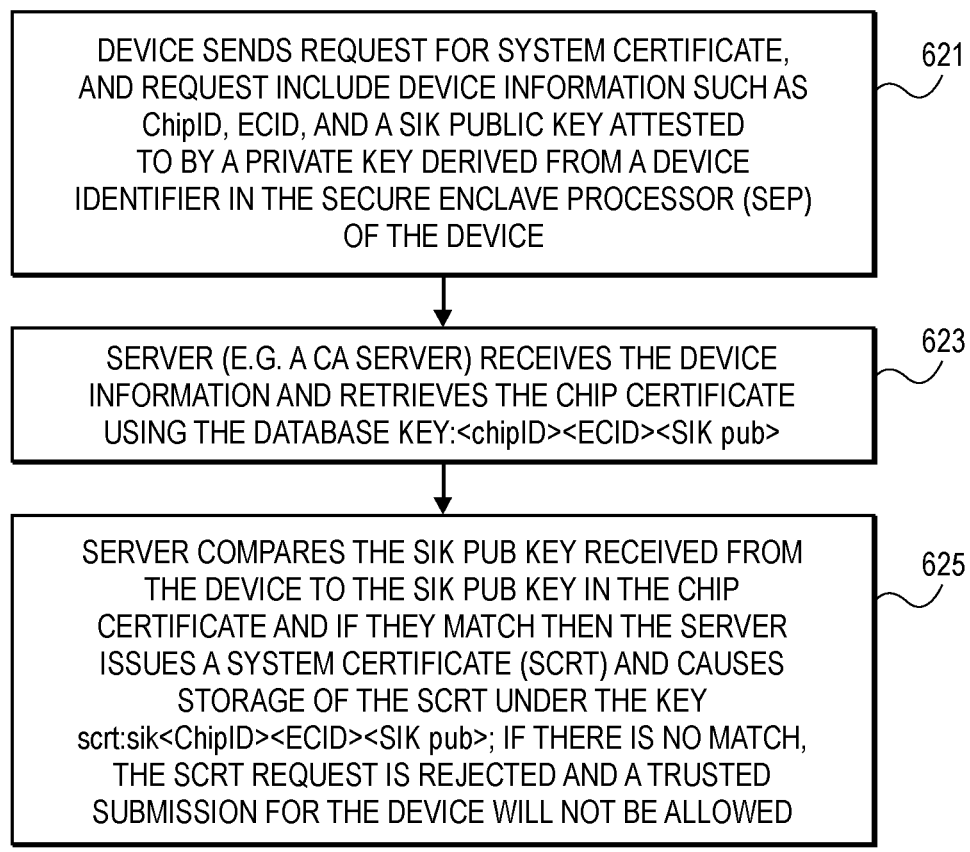
FIG. 6B shows a flowchart that illustrates a method, according to an embodiment, for collecting information from a device to create a system certificate.

A more detailed version of the process for storing calibration data on a remote data store will now be provided while referring to FIGS. 5A and 5B. The method shown in FIG. 5A can use the set of systems shown in FIG. 5B, where the systems included in that set include one or more calibration stations such as calibration station 525, a device such as device 527, one or more certificate authority servers such as certificate authority server 529 and one or more data stores, such as the factory data recovery (FDR) data store 531 shown in FIG. 5B. These systems can be coupled together through one or more networks to allow the data and commands to be communicated among the systems as shown in the example of FIG. 5B. In operation 501 of FIG. 5A, the device receives calibration data for one or more sensors in the device. This is shown as the write operation 535 in FIG. 5B wherein the device 527 receives calibration data for one or more sensors in the device 527 from one or more calibration stations such as calibration station 525. Then in operation 503 of FIG. 5A, the device sends a request to a certificate authority server, such as certificate authority server 529, to obtain a device certificate for the device from the certificate authority server. This is shown as request 537 in FIG. 5B in which the device requests a device certificate and provides device data. For example, the device can send, as part of the request, a reference public key of the device and an attestation of the reference public key by the SIK private key of the device and can also send other data including the SIK public key and a device identifier (such as a chip identifier and integrated circuit identifier). Then in operation 505, this certificate authority server, such as certificate authority server 529 receives the attestation and other data from the device, such as device 527 shown in FIG. 5B. Then in operation 507, the certificate authority server sends a system certificate database key to retrieve a previously stored system certificate for the device. In one embodiment, this database key includes a device identifier, such as a chip family identifier ("ChipID") and an integrated circuit identifier (ECID) and the SIK public key for the device. In one embodiment, the database key that is configured to obtain the system certificate (scrt) can have the following format: scrt:sik<ChipID><ECID><SIK pub key>. The database key will cause the data store to retrieve from the database the system certificate, previously generated for the device, where the system certificate for the device is stored in association in the database with the database key for the system certificate. In one embodiment, the chip family identifier identifies a particular family of an integrated circuit such as the A10 processor from Apple Inc. of Cupertino Calif.; the chip identifier (ECID) can be a unique serial number specifying a particular integrated circuit in that particular family and the unique serial number is unique within the particular family. In this example, the letters "sik" signify that the system certificate is for a device that uses the methods described herein for FDR (factory data recovery) as opposed to the methods described in U.S. Pat. No. 9,542,558 for FDR; this allows the CA servers and data stores to provide FDR services for older devices that use the older FDR methods while also providing service to newer devices that use the FDR methods described herein. In one embodiment, the system certificate is previously generated and stored in the data store before the certificate authority server sends the database key in operation 507. FIGS. 6A and 6B show an example of how the system certificate can be generated and stored prior to the request to retrieve the system certificate for the corresponding system certificate database key. The methods shown in FIGS. 6A and 6B will be described further below.

Operation 507 in FIG. 5A corresponds to the operation 539 shown in FIG. 5B. The data store 531 in FIG. 5B obtains the appropriate system certificate by finding a match in the database between a system certificate database key in the database and the received system certificate database key that includes the device identifier(s) of the device and the SIK public key for the device. The matching system certificate (associated in the database with the matching scrt database key) is then returned in operation 541 to the certificate authority server 529 which in turn causes operation 509 shown in FIG. 5A. In operation 509, the certificate authority server, such as certificate authority server 529, receives the system certificate for the device and obtains the SIK public key from the system certificate and verifies the attestation of the ref pub key using the SIK public key and then checks the permissions requested relative to permissions allowed for the SIK public key. This is also shown as operation 543 in FIG. 5B. If the device's requested permissions match the allowed permissions then the certificate authority server will issue a device certificate to the device for the particular reference public key (ref pub key), and the issuance of the device certificate is also shown as operation 545 in FIG. 5B. In one embodiment, the attestation of the ref pub key can use the SIK private key to sign the ref pub key (or a hash of the ref pub key); for example, the attestation can be of the form: SIK private key[hash(ref pub key)]; the verification uses the SIK pub key to decrypt the signature to obtain [hash(ref pub key)] which can be compared against the value resulting from the same hash of the ref pub key from the device. If the values match, then the attestation is verified. In one embodiment, the attestation establishes that the ref pub key originated from the secure enclave processing system that is trusted by the certificate authority servers, such as the certificate authority server 529. In one embodiment, the ref pub key is a signing key that is used to sign the file containing the calibration data and to authenticate the calibration data for the device.

After the device receives the device certificate, the device can perform operation 511 shown in FIG. 5A. This corresponds to operation 547 shown in FIG. 5B. In operation 511, the device can send to the data store calibration data for each calibrated sensor and its corresponding database key; the calibration data can be authenticated with the device certificate and the device's reference key such as an authentication through the use of the private reference key (ref priv key) which signs the calibration data which in turn can be authenticated by using the public reference key (ref pub key) to retrieve the calibration data from the signed calibration data. In one embodiment, the calibration data can be packaged as an IMG4 file signed by the private reference key (ref pry key) which corresponds to the ref pub key. In one embodiment, the calibration data is stored under the key having a format of: <Cal data class>:sik<data instance><SIK pub key>, where the Cal data class specifies the type of the sensor calibration data and the data instance includes the sensor identifier for the sensor. The data instance can include the calibration data or the calibration data can be stored in association with the key and transmitted in association with the key. Once the calibration data has been successfully stored on the data store, the data store, such as data store 531 can return, in operation 549 shown in FIG. 5B and in operation 513 shown in FIG. 5A a confirmation that storage of the calibration data was successful. In one embodiment, this completes the process of the storage of the calibration data which then can be used later to restore the calibration data in a method such as the method shown in FIG. 7 which will be described further below.

Figure 5C:
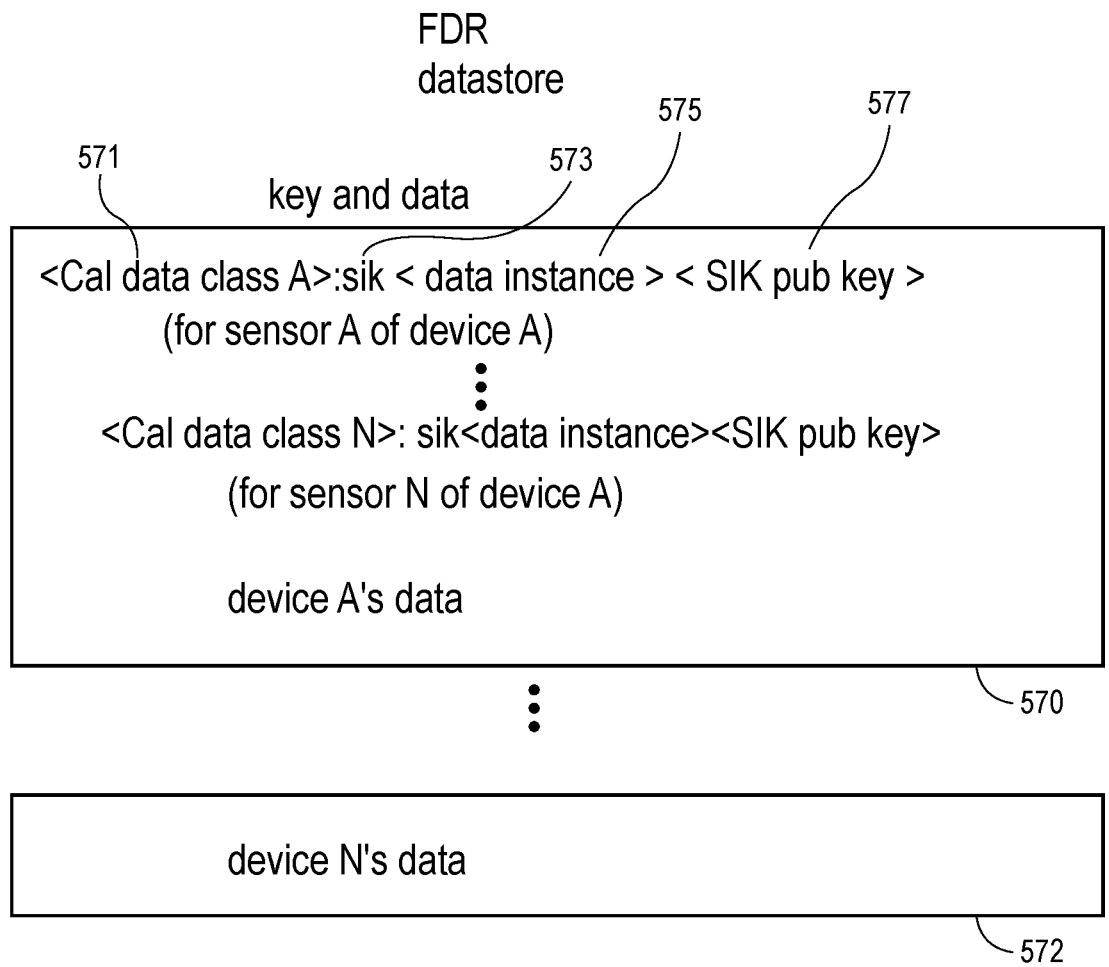
FIG. 5C shows an example of a database according to an embodiment that can store calibration data in a datastore.

FIG. 5C shows an example of an FDR data store containing a database which includes database keys and corresponding data such as calibration data. In the example shown in FIG. 5C, at least two devices have stored calibration data for those devices in the data store shown in FIG. 5C. In the case of device A, device A has stored data 570 which includes data for a plurality of sensors including sensor A of device A and sensor N of device A. Device N has also stored data 572 on the data store. It will be appreciated that in normal practice, the FDR data store will include calibration data and keys for this calibration data from many devices which have been fabricated in a factory and these many devices have provided that calibration data during the factory assembly process to the FDR data store. The data 570 can be in the format shown in FIG. 5C in which the calibration data class 571 specifies a particular data class for a sensor. The "sik" field indicator 573 shows that the calibration data and the database key are for an FDR method described in this disclosure as opposed to the prior version of FDR methods described in U.S. Pat. No. 9,542,558. The data instance 575 can include the sensor identifier which is associated within the database key with the SIK public key 577 as shown in FIG. 5C. In one embodiment, the device can store in the database, for each sensor of the different sensors on the device, the appropriate key and the corresponding calibration data. In one embodiment, the data instance, such as data instance 575, can include the calibration data and the sensor identifier within the data instance while in another embodiment, the data instance field stores the sensor identifier in a row of the database and the corresponding calibration data is stored in a different field in that row.

In one embodiment, the methods shown in FIGS. 5A and 5B rely upon the generation and storage of information about a device prior to the device attempting to upload calibration data to a data store. In one embodiment, this information can include a chip certificate which can then be used to derive and generate a system certificate for the device which can then be provided to the device upon proper authentication of the device. FIGS. 6A and 6B show a method in which a chip certificate can be generated for an integrated circuit (on for example a circuit board) and then cause the generation of a system certificate based upon that chip certificate, where the system certificate can then be stored in a data store such as the data store 531 shown in FIG. 5B for use during the methods described relative to FIGS. 5A and 5B. In operation 601 of FIG. 6A, an integrated circuit can send information to a server, such as a certificate authority server, in order to obtain a chip certificate. In one embodiment, the information which is sent can include an SIK pub key, a chip ID, and an ECID. In one embodiment, the chip ID and the ECID can identify the device. The SIK pub key can be the same public key as described above for the device and can be attested to as having originated from the secure enclave processing system of the device as an SIK public key paired with the SIK private key. In one embodiment, the integrated circuit can be a system on chip integrated circuit which includes both an application processing system and a secure enclave processing system which is a co-processor with the application processing system. In operation 603, the server receives this information from operation 601; as shown in FIG. 6A, the SIK public key can be attested to by a private key (e.g., the private key signs the SIK public key to attest to the SIK public key) and the private key has a corresponding public key (in an asymmetric key pair) that is known to the certificate authority server; this knowledge can be a result of the prior allocation of one or more device identifiers and predetermined cryptographic seeds to the integrated circuit prior to manufacture of the integrated circuit such that the certificate authority server can assume that the integrated circuit will include those previously allocated one or more device identifiers and predetermined cryptographic seeds which can be used to generate one or more pairs of asymmetric cryptographic keys for that particular integrated circuit and thus the certificate authority server can have knowledge of the corresponding public key that can verify the attestation by the private key. The server in operation 605 can then verify the attestation of the SIK public key and can issue a chip certificate for the integrated circuit if the server successfully verifies the attestation of the SIK public key. Then in operation 607, the server can store the chip certificate (cert) under the key: ccrt:sik<ChipID><ECID><SIK pub key>. This chip certificate can then be used in the method of FIG. 6B to create a system certificate which can then be provided to the device upon request after verifying the device has permission to receive the system certificate as described relative to the methods shown in FIGS. 5A and 5B. In the method shown in FIG. 6B, the device, in operation 621, sends a request for a system certificate, and the request can include a database key that includes device information such as the Chip ID, the ECID, and an SIK public key attested to by a private key that is derived from a device identifier in the secure enclave processing system of the device. In one embodiment, the database key can have the form of: ccrt:sik<ChipID><ECID><SIK pub key>. In operation 623, a server, such as a certificate authority server, can receive the device information and retrieve the chip certificate using the database key provided by the device in operation 621. Then in operation 625, the server can compare the SIK public key received from the device to the SIK public key in the chip certificate and if they match the server issues in one embodiment a system certificate (scrt) and causes storage of the system certificate under the database key: scrt:sik<ChipID><ECID><SIK pub key>; if there is no match, the request for the system certificate is rejected and a trusted submission for the device using the methods described herein (such as the methods shown in FIGS. 5A and 5B) will not be allowed because the device does not have a system certificate that is valid.

Figure 7:
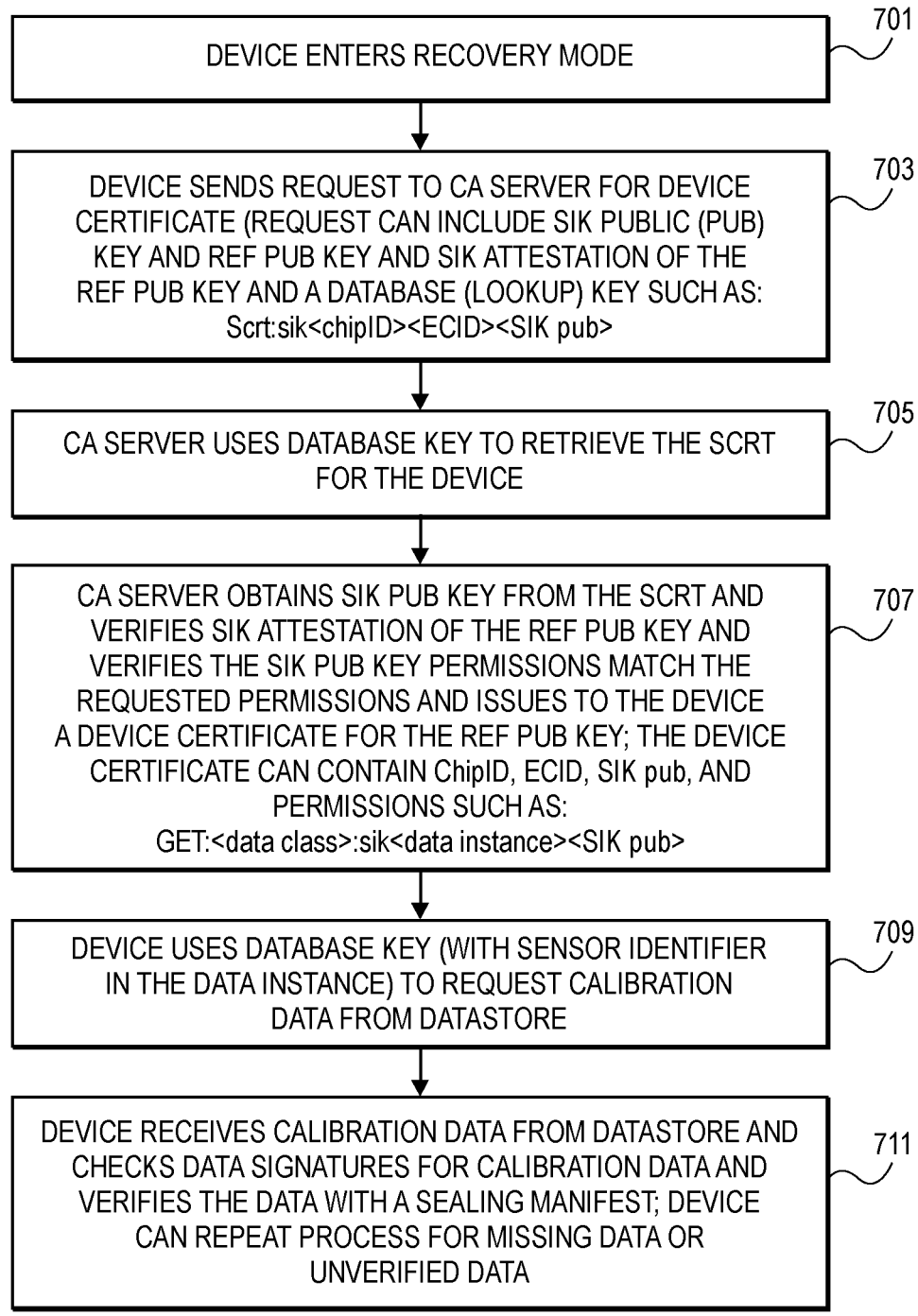
FIG. 7 is a flowchart that shows a method, according to an embodiment, to implement a recovery mode for a device to recover calibration data for the device.

FIG. 7 shows an example of a method for how a device can perform a recovery of calibration data according to one embodiment. This recovery can occur after the calibration data has been stored in a remote data store, such as the data store 531 shown in FIG. 5B. The recovery operation can begin in operation 701 shown in FIG. 7 in which the device enters a recovery mode. The recovery mode may occur as a result of the device having been intentionally erased when it was lost or stolen or as a result of a repair of the device or for other reasons. Typically, the recovery mode involves a boot up of the device using read-only memory (ROM) in the secure enclave processing system and potentially also the application processing system to enter the recovery mode. In the recovery mode, user applications are typically not enabled but essential system services such as network access will be enabled in order to communicate with remote data processing systems such as one or more certificate authority servers and one or more data stores which store the calibration data. In operation 703, the device sends a request to a certificate authority server for a device certificate. In one embodiment, this request can include an SIK public key of the device and a ref pub key generated by the SEP system of the device and an SIK attestation of the ref pub key generated by the SEP system of the device and a database key such as a key in the format of: scrt:sik<Chip ID><ECID><SIK pub key>. In operation 705, the certificate authority server can use this database key to retrieve the system certificate for the device. Then in operation 707, the certificate authority server can obtain the SIK public key from the system certificate and can verify the attestation of the ref public key by using the SIK pub key from the system certificate to verify the attestation. In one embodiment, the ref public key is attested to by the SIK private key and that attestation can be verified by the SIK public key (e.g., the verification of the attestation can take the form of: does SIK pub key[SIK pry key(hash{ref pub key})] match hash{ref pub key}?). In addition, the certificate authority server can verify the permissions associated with the SIK public key match the requested permissions from the device and if the permissions match, the certificate authority server can issue to the device a device certificate for the corresponding ref public key. In one embodiment, the device certificate can contain the following information: Chip ID; ECID; SIK pub key; and the permissions for recovering, for each sensor of the device, :<Cal data class>:sik<data instance><SIK pub key>. The data instance can include the sensor identifier for the sensor in the data class. Then in operation 709, the device can use the database key, which includes the sensor identifier within the data instance, to request the calibration data from the data store. Then in operation 711, the device can receive the calibration data from the data store and can check the data for signatures for the calibration data and can verify the data with a sealing manifest in one embodiment. The use of sealing manifests are described in U.S. Pat. No. 9,542,558. In one embodiment, the calibration data can be signed with the private reference key (ref pry key) and the calibration data can also be authenticated with a device certificate. In one embodiment, the device can repeat the process for missing data or unverified data in order to obtain all of its calibration data and other provisioning data in one embodiment.

Figure 8:
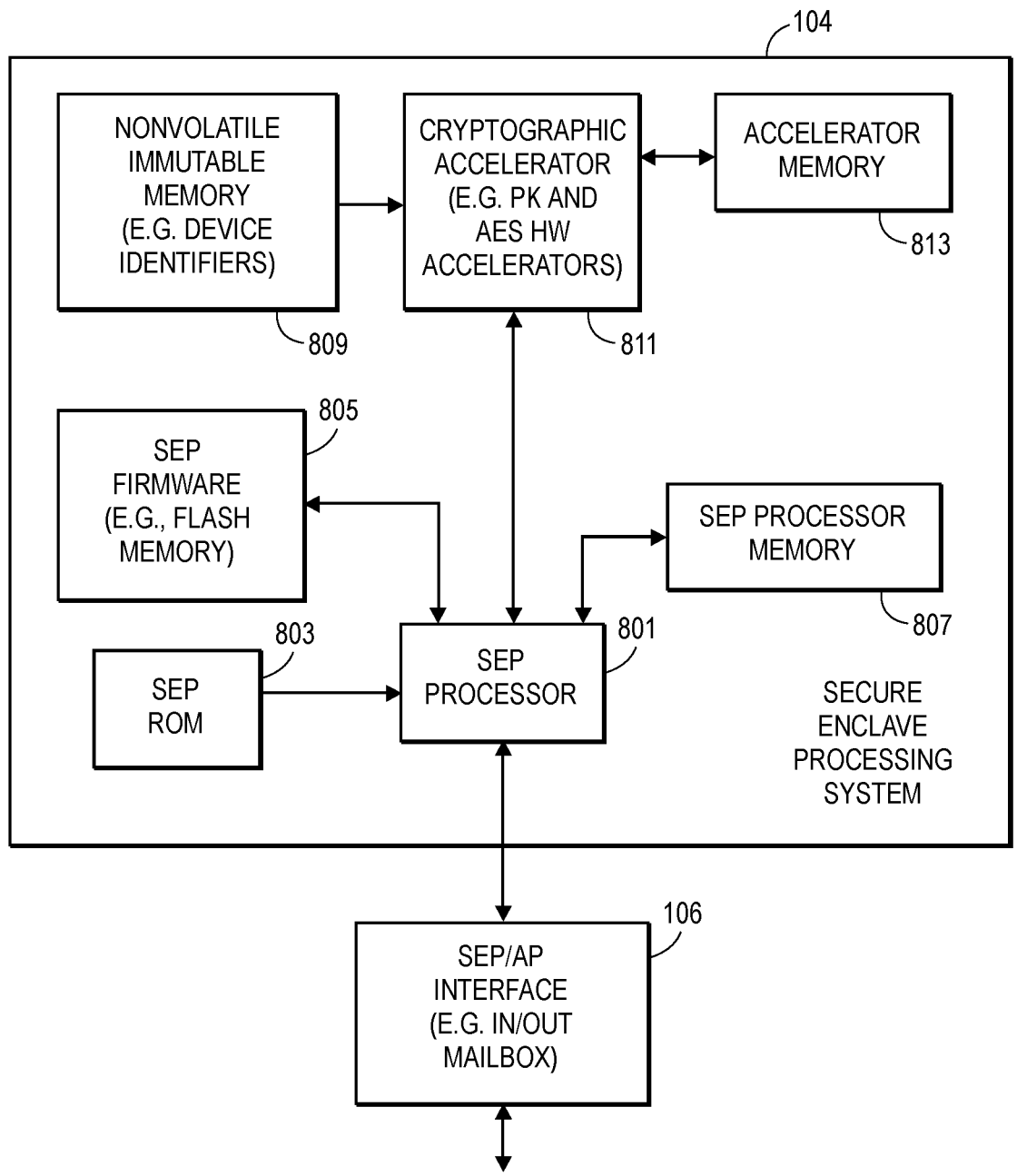
FIG. 8 is a block diagram of an example of a secure enclave processing system according to an embodiment.

FIG. 8 shows an example of a secure enclave processing system that can be part of a system on-chip (SOC) which can be used in the one or more embodiments described herein. As is known in the art, a system on-chip can include one or more processors and memory controllers and other components on a single integrated circuit. In the example shown in FIG. 8, the SOC can include an application processor (not shown) that is coupled to a secure enclave processing system through the secure interface 106 which can include an in-box and an out-box mailbox interface. The application processor can be one or more processors that execute the application processor operating system and the user programs in order to provide access to user data which can be one or more user files that are manipulated, created or otherwise used by user programs under the direction of the user of the user programs. The SEP processor 801 can be a dedicated cryptographic processor that performs the various security functions including validating code signatures, processing of user passcodes, the creation or generation of cryptographic keys, the encryption of keys, the decryption of keys, enable or disable changes of security settings or policies, and the encryption and decryption of one or more user files. The SEP processor 801, in one embodiment, can perform at least a portion of the operations in the methods shown in this disclosure, as well as other methods described herein, and the SEP processor 801 can perform one or more of these operations by executing the firmware 805 which causes these operations to be performed. The SEP ROM 803 can store executable code which is immutable but readable in order to boot up the SEP processor 801. The executable code in ROM 803 can be trusted software that can validate the software in firmware 805 before allowing that firmware to execute by checking a code signature of the firmware (which can be referred to as a measurement or hash of the firmware) and verifying that the code signature indicates that firmware is valid and has not been corrupted before allowing the firmware to be executed by the SEP processor 801. The executable code in ROM 803 can be created in the factory that creates the SEP processor 801. The SEP processor 801 can continue the process of checking code signatures of successively higher layers of software, up to, in one embodiment, the user programs that execute on the application processor. SEP ROM 803 can perform in conjunction with the SEP processor 801 and cryptographic accelerator 811 the measurement or hash of the image of firmware stored in firmware 805 which can be flash memory which is both readable and writeable and they can calculate the measurements or hashes of other software. When the hash is calculated by the SEP ROM 803 and the SEP processor 801, the hash can be stored in the SEP memory 807. In one embodiment, the SEP memory 807 can be coupled to both the SEP processor 801 and to the cryptographic accelerator 811. The cryptographic accelerator 811 can use non-volatile immutable memory 809 which can store one or more device identifiers, such as universally unique device identifiers for the particular device which are fused into the SEP system at the time of manufacture so that the device identifier is non-volatile and immutable. In addition, other cryptographic parameters can be stored in the non-volatile immutable memory 809 and used by the cryptographic accelerator 811. In one embodiment, the cryptographic accelerator can also include accelerator memory 813 which can be similar to scratchpad memory which is used to perform the cryptographic operations that are accelerated by the cryptographic accelerator 811. These operations can include public key cryptographic (asymmetric) operations as well as symmetric key operations, such as AES acceleration using the hardware accelerator modules provided by the cryptographic accelerator 811. Further information about embodiments of secure enclave processors can be found in U.S. Provisional Patent Application Nos. 62/276,913 filed Jan. 10, 2016 and 62/171,705 filed Jun. 5, 2015, and both of these U.S. provisional patent applications are incorporated herein by reference. Embodiments of an SEP are also described in U.S. Patent Application Publication No. US 2014/0089682 A1 which is also incorporated herein by reference.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 9:
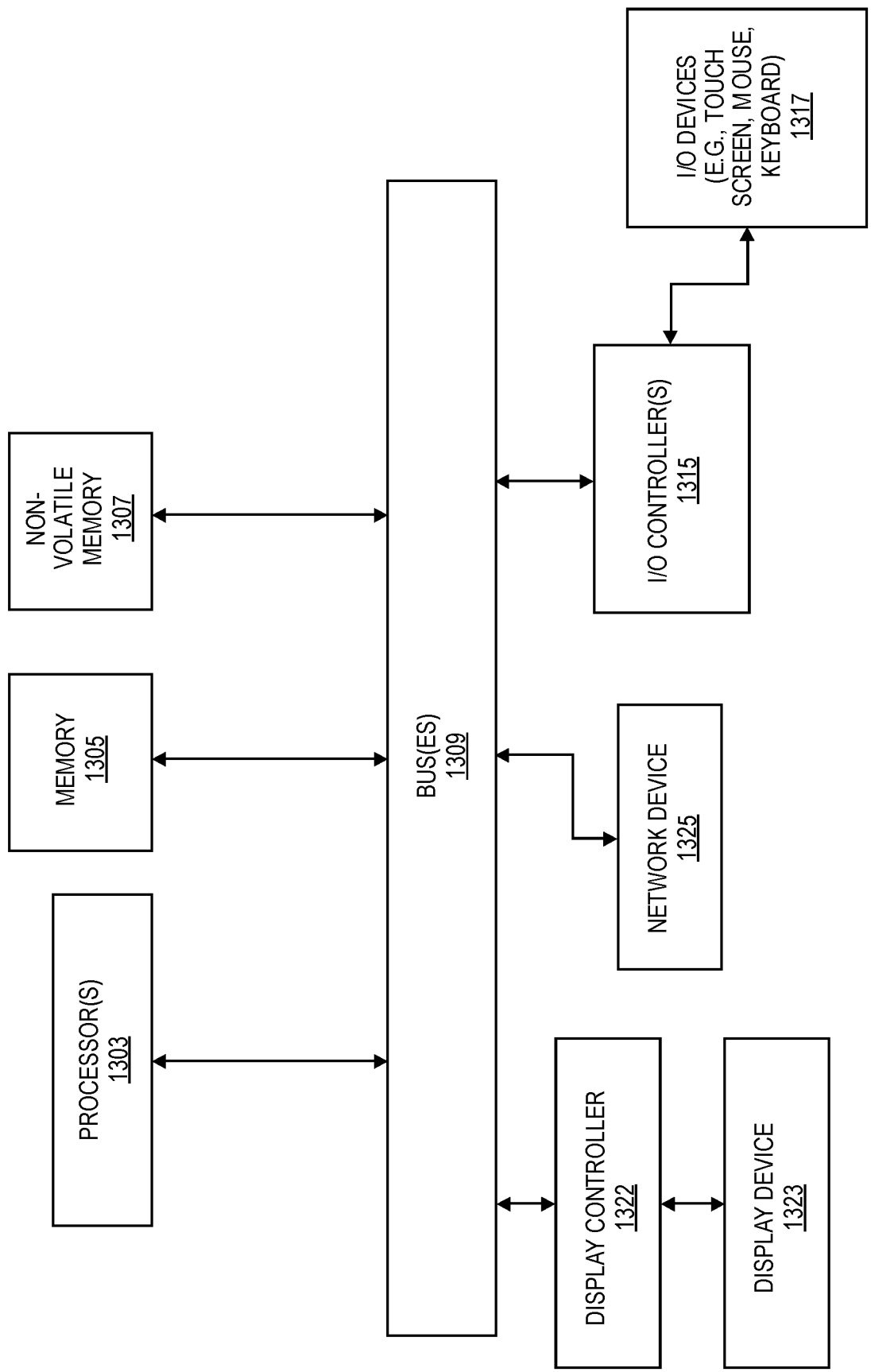
FIG. 9 is a block diagram of an example of a data processing system which can be used with one or more embodiments of the devices and servers and data stores described herein.

FIG. 9 is a block diagram of data processing system hardware according to an embodiment. Note that while FIG. 9 illustrates the various components of a data processing system that may be incorporated into a mobile or handheld device or a server system, it is not intended to represent any particular architecture or manner of interconnecting the components as such details are not germane to the present invention. It will also be appreciated that other types of data processing systems that have fewer components than shown or more components than shown in FIG. 9 can also be used with the present invention.

As shown in FIG. 9, the data processing system includes one or more buses 1309 that serve to interconnect the various components of the system. One or more processors 1303 are coupled to the one or more buses 1309 as is known in the art. In one embodiment, the one or more processors 1303 can be the SOC 102 shown in FIG. 1. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, microphones and other input devices including those known in the art and output devices (e.g. speakers). The input/output devices 1317 are coupled through one or more I/O controllers 1315 as is known in the art.

While FIG. 9 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., cellular telephone, WI-FI, Bluetooth).

It will be apparent from this description that aspects of the present invention may be embodied, at least in part, in software. That is, the techniques may be carried out in a data processing system in response to its one or more processors executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

As described above, one aspect of the present technology is the gathering and use of data available from one or more sources to improve the performance of sensors by using calibration data or other data. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve performance of sensors by using calibration data or other data. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to store or use certain types of calibration data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, calibration of sensors can be based on non-personal information data or a bare minimum amount of personal information.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
    entering into a recovery mode on a device; and
    transmitting, by the device while in recovery mode, a database key that includes a sensor identifier and a first public key of the device, the sensor identifier for a first sensor in a plurality of sensors included on the device, the database key used to retrieve, from a factory data recovery database separate from the device, calibration data for the first sensor, wherein the factory data recovery database stores calibration data for a plurality of devices.

2. The medium as in claim 1 wherein the calibration data is configured to provide calibrated results for the first sensor and wherein the set of one or more sensors includes a plurality of sensors, each calibrated with calibration data.

3. The medium as in claim 2 wherein the set of one or more sensors includes at least two of: a baseband processor sensor, a near field communication sensor, a touch identification sensor, an ambient light sensor, and a facial recognition sensor.

4. The medium as in claim 1 wherein the method further comprises:
    receiving the calibration data after the device has been verified to have permission to receive the calibration data, wherein an association in the database key of the sensor identifier and the first public key prevents a data instance collision when two sensors in two different devices have the same sensor identifier.

5. The medium as in claim 4, the method further comprising:
    storing the calibration data in a main nonvolatile memory of the device, the main nonvolatile memory storing an operating system of an application processing system and one or more application programs that execute on the application processing system.

6. The medium as in claim 1 wherein the first public key is an attestation key that is paired, through public key cryptography, with a first private attestation key that is generated in and secured within a secure enclave processor in the device.

7. The medium as in claim 6 wherein the method further comprises:
    receiving a device certificate which includes the first public key and one or more identifiers of the device; and
    wherein the first public key is used to verify attestation of a first signing public key by the first private attestation key, the attestation establishing that the first signing public key originated from the secure enclave processor that is trusted by a certificate authority.

8. The medium of claim 1, wherein when the device is in the recovery mode user applications are not enabled.

9. A non-transitory machine readable medium storing executable program instructions which when executed by a data processing system cause the data processing system to perform a method comprising:
    entering, by a device, into a mode on the device to set up calibration data for a first sensor on the device;
    receiving, by the device, calibration data for the first sensor, the first sensor including a sensor identifier for the first sensor and the first sensor is one of plurality of sensors included on the device; and
    transmitting, by the device, a database key that includes the sensor identifier associated in the database key with a first public key, the database key configured to retrieve, from a factor data recovery database separate from the device, calibration data for the sensor in a recovery mode of the device, wherein the factory data recovery database stores calibration data for a plurality of devices.

10. The medium as in claim 9, wherein the method further comprises:

transmitting, by the device, a first signing public key and an attestation of the first signing public key by a first private attestation key that is generated in and sequestered in a secure enclave processor in the device, the first private attestation key being paired, through public key cryptography, with the first public key.

11. The medium as in claim 9 wherein the calibration data is configured to provide calibration results for the first sensor, and the device includes a plurality of sensors including the first sensor, and each sensor of the plurality of sensors is calibrated with calibration data.

12. The medium as in claim 11 wherein the plurality of sensors includes at least two of: a baseband processor sensor, a near field communication sensor, a touch identification sensor, an ambient light sensor, and a facial recognition sensor.

13. The medium as in claim 9 wherein the method further comprises:
transmitting the calibration data to a data store after the device has been verified to have permission to store the calibration data on the data store which stores the database, wherein an association in the database key of the sensor identifier and the first public key prevents a data instance collision when two sensors in two different devices have the same sensor identifier.

14. The medium as in claim 9 wherein the method further comprises:
storing the calibration data in a main nonvolatile memory of the device, the main nonvolatile memory storing an operating system of an application processing system and one or more application programs that execute on the application processing system.

15. The medium as in claim 14 wherein the method further comprises:
receiving a device certificate, from a certificate authority, which includes the first public key and one or more identifiers of the device and a set of one or more permissions relating to the calibration data;
wherein the first public key is an attestation key that is paired, through public key cryptography, with a first private attestation key that is generated in and secured within a secure enclave processor in the device, and wherein the first public key is used to verify attestation of a first signing public key by the first private attestation key, the attestation establishing that the first signing public key originated from the secure enclave processor that is trusted by the certificate authority.

16. A system for permitting a device to recover calibration data, the system comprising:
a set of one or more certificate authority servers; and
a set of one or more data stores, separate from the device and coupled to the set of one or more certificate authority servers, the set of one or more certificate authority servers configured to receive, from the device, a database key that includes a sensor identifier that identifies a first sensor of the device and a first public key of the device, the database key configured to retrieve, from a factory data recovery database stored in the set of one or more data stores, calibration data for the first sensor, wherein the first sensor is one of a plurality of sensors included on the device, wherein the factory data recovery database stores calibration data for a plurality of devices.

17. The system as in claim 16 wherein the calibration data is configured to provide calibration results for the first sensor, and the device includes a plurality of sensors including the first sensor, and each sensor of the plurality of sensors is calibrated with calibration data.

18. The system as in claim 17 wherein the plurality of sensors includes at least two of:
a baseband processor sensor, a near field communication sensor, a touch identification sensor, an ambient light sensor, and a facial recognition sensor.

19. The system as in claim 16 wherein the set of one or more data stores is configured to transmit, to the device, the calibration data after the set of one or more certificate authority servers have verified the device has permission to receive the calibration data, and wherein an association in the database key of the sensor identifier and the first public key prevents a data instance collision when two sensors in two different devices have the same sensor identifier.

20. The system as in claim 19, wherein the first public key is an attestation key that is paired, through public key cryptography, with a first private attestation key that is generated in and secure within a secure enclave processor in the device.

21. The system as in claim 20, wherein the set of one or more certificate authority servers is configured to transmit, to the device, a device certificate that includes the first public key and one or more identifiers of the device, and wherein the first public key is used to verify attestation of a first signing public key by the first private attestation key, the attestation establishing that the first signing public key originated from the secure enclave processor that is trusted by the set of one or more certificate authority servers.

* * * * *